United States Patent [19]

Ito et al.

[11] Patent Number: 4,914,982
[45] Date of Patent: Apr. 10, 1990

[54] DEVICE AND METHOD OF FAIL-SAFE CONTROL FOR ELECTRONICALLY CONTROLLED AUTOMATIC TRANSMISSION

[75] Inventors: Yasunobu Ito; Kenji Suzuki; Muneo Kusafuka, all of Aichi, Japan

[73] Assignee: Aisin-AW Kabushiki Kaisha, Japan

[21] Appl. No.: 282,276

[22] Filed: Dec. 9, 1988

[30] Foreign Application Priority Data

Dec. 28, 1987 [JP] Japan ................. 62-329509

[51] Int. Cl.<sup>4</sup> ............................. B60K 41/18
[52] U.S. Cl. ........................ 74/844; 74/878
[58] Field of Search ................. 74/844, 878

[56] References Cited

U.S. PATENT DOCUMENTS

| | | | |
|---|---|---|---|
| 2,353,840 | 7/1944 | McKechnie | 74/844 |
| 2,457,692 | 12/1948 | La Brie | 74/844 |
| 3,748,929 | 7/1973 | Green | 74/844 |
| 3,895,541 | 7/1975 | Nohira et al. | 74/844 |
| 4,208,929 | 6/1980 | Heino | 74/731 |

FOREIGN PATENT DOCUMENTS 0203255 11/1983 Japan ..................... 74/844

*Primary Examiner*—Dirk Wright
*Attorney, Agent, or Firm*—Lorusso & Loud

[57] ABSTRACT

In a fail-safe control device for an electronically controlled automatic transmission to be mounted on a vehicle, the oil temperature in the transmission is detected by an oil temperature sensor provided for the transmission, and if the oil temperature in the transmission exceeds an allowable level with the lockup operation always prohibited, the gear shift to the maximum gear stage is prohibited.

As a result of this, slippage generated in the torque converter can be reduced and the oil temperature in the T/M can be lowered so that a fail-safe control can be performed.

4 Claims, 3 Drawing Sheets

DEVICE AND METHOD OF FAIL-SAFE CONTROL FOR ELECTRONICALLY CONTROLLED AUTOMATIC TRANSMISSION

BACKGROUND OF THE INVENTION

The present invention relates to a fail-safe control for an electronically controlled automatic transmission to be mounted on a vehicle, and, more particularly, to a fail-safe control against a failure of a solenoid for controlling a lockup in an electronically controlled automatic transmission.

In a conventional electronically controlled automatic transmission, changes in gear ratio of the transmission (hereinafter ("T/M") and the operation of the lock-up clutch are, in general, effected in response to signals representing the degree of opening of the throttle and the car speed by operation of an actuator such as a solenoid secured to the T/M is controlled.

In a case where an actuator such as a solenoid for controlling lockup (hereinafter "lock-up solenoid") experiences a problem such as short circuit or a disconnection, the lock-up clutch is generally turned off responsive to the failure of the actuator.

However, in the conventional control method, since the lockup operation is always prohibited during the above-described type of failure, a problem arises that a slippage occuring in the torque converter causes a rise of the oil temperature of the T/M when operation load is high, as at the time of high-speed running at the maximum gear stage (the fourth gear in general) or on a mountain drive or the like.

SUMMARY OF THE INVENTION

An object of the present invention is to provide a reliable fail-safe control device and a fail-safe control method for an electronically controlled automatic transmission which serve to prevent gear shift to the maximum gear stage responsive to oil temperature of the transmission and thereby permit increase in the slippage in the torque converter and a reduction of the oil temperature of the T/M.

In order to achieve the above-described object, a fail-safe control device for an electronically controlled automatic transmission is provided, which device includes an oil temperature sensor provided for the transmission; means for determining whether the oil temperature detected by said oil temperature sensor exceeds an allowable level in a state where the lockup operation is always prohibited; means for prohibiting gear shift to the maximum gear stage when the determining means determines that the oil temperature of the transmission exceeds the allowable level.

Furthermore, a fail-safe control method for an electronically controlled automatic transmission is provided which includes detecting the oil temperature in a transmission by an oil temperature sensor provided for the transmission, and prohibiting gear shift to the maximum gear stage when the oil temperature in the transmission exceeds an allowable level in a state where a lockup operation is always prohibited.

As described above, according to the present invention, the oil temperature in a T/M is continuously detected by the oil temperature sensor provided for the T/M and gear shift to the maximum gear stage is prohibited if the oil temperature of the T/M exceeds an allowable level (for example, above 150° C.) due to a failure or the like of the lock-up solenoid with the lockup operation prohibited. As a result, slippage in the torque converter can be reduced and the oil temperature in the T/M can be lowered.

DESCRIPTION OF THE PREFERRED EMBODIMENT

Figure 1:
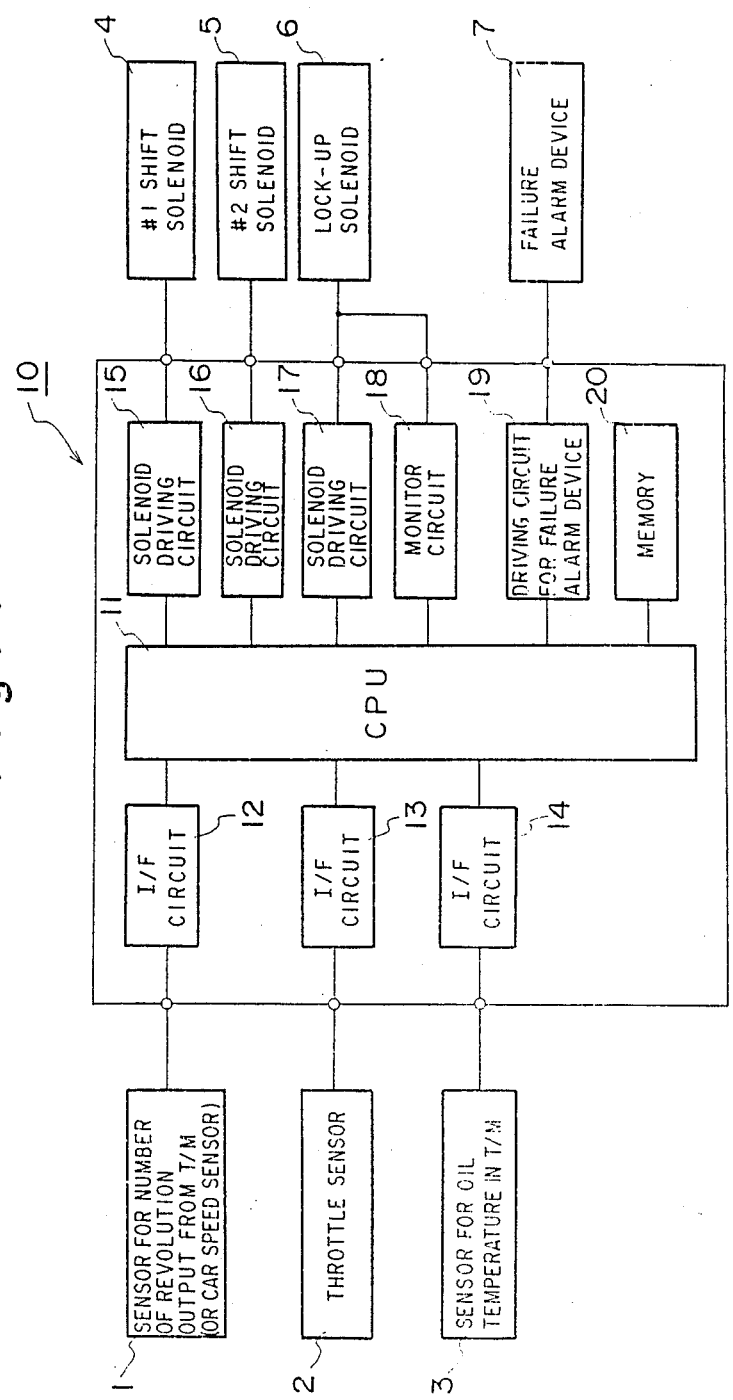
FIG. 1 is an overall structural view of a fail-safe control system for an electronically controlled automatic transmission according to an embodiment of the present invention.

Referring to the drawings, an embodiment of the present invention will be described in detail.

FIG. 1 is an overall structural view of a fail-safe control system for an electronically controlled automatic transmission according to an embodiment of the present invention.

Referring to this drawing, reference numeral 1 represents a sensor for detecting the number of revolution output from a T/M (or a car speed sensor), 2 represents a throttle sensor, 3 represents a sensor for the oil temperature in the T/M, 4 represents a first shift solenoid, 5 represents a second shift solenoid, 6 represents a lock-up solenoid, 7 represents a failure alarm device, 10 represents an electronic control device, 11 represents a central processing unit (CPU), 12 to 14 each represent an interface circuit, 15 represents a driving circuit for the first shift solenoid 4, 16 represents a driving circuit for the second shift solenoid 5, 17 represents a driving circuit for the lock-up solenoid 6, 18 represents a monitor circuit for the lock-up solenoid 6, 19 represents a driving circuit for the failure alarm device, and 20 represents a memory.

Figure 2:
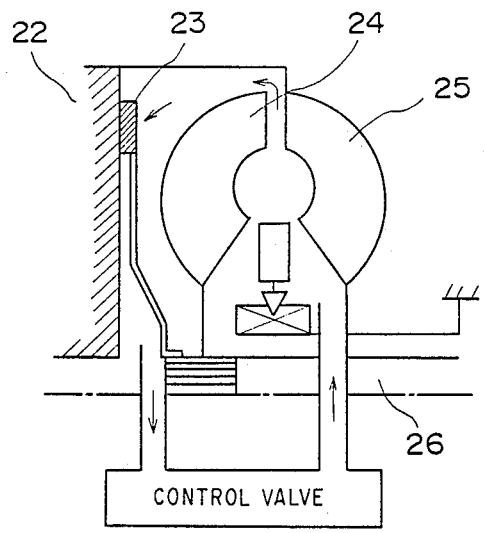
FIGS. 2a and 2b illustrate the operation mechanism of a lockup to the present invention.
Figure 2:
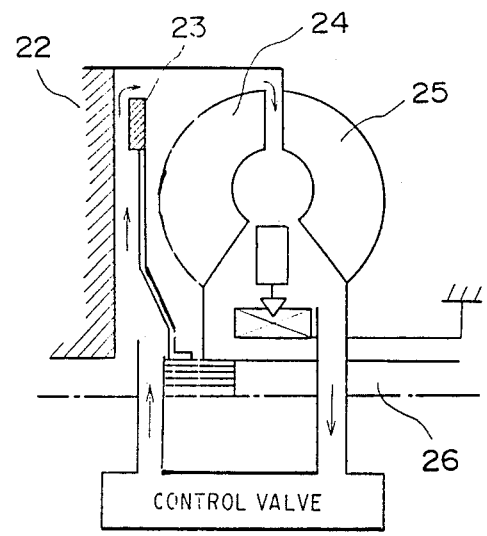
Figure 3:
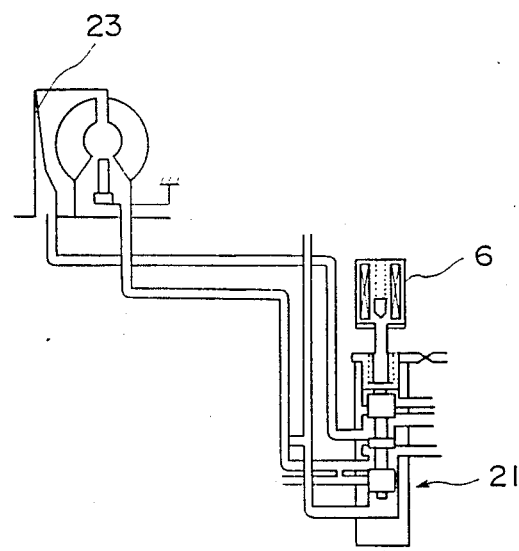
FIG. 3 illustrates the relationship between a lockup clutch and a lock-up relay valve according to the present invention.

In this state, when the lockup operation is performed, the oil passage is, as shown in FIG. 3, changed by turning on of the lock-up solenoid 6 of the lock-up relay valve 21. As a result of this, the direction of the oil flow introduced to the lock-up clutch 23 becomes as shown in FIG. 2 (a). Therefore, the lock-up clutch 23 engages to the front cover 22 so that the crank shaft of an engine and the input shaft of the transmission are directly connected. That is, power is transmitted from the engine, via the front cover 22 and the lock-up clutch 23, to the OD input shaft 26.

On the other hand, when the lockup is released, the oil flow is changed to the reverse direction to that at the time of engagement by the operation of the lock-up relay valve 21 so that it becomes as shown in FIG. 2 (b). That is, power is transmitted from the engine, via the front cover 22, pump impeller 25, and turbine runner 24, to the OD input shaft 26.

Figure 4:
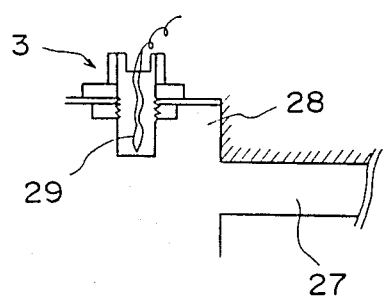
FIG. 4 illustrates an oil temperature sensor according to the present invention.

Furthermore, the sensor 3 for the oil temperature in the T/M, for example as shown in FIG. 4, is secured to a cooler 28 disposed within oil passage 27 in communicate with the lock-up relay valve 21, and the same includes a thermistor 29 as a detecting element.

In this system as shown in FIG. 1, in accordance with a signal representing the degree of opening of the throttle from the throttle sensor 2 and a signal from the sensor 1 for the number of revolutions output from the T/M (or car speed sensor), the gear ratio of the T/M and state of the lock-up clutch are determined. A driving circuit 17 for driving the shift solenoids 4 and 5 mounted on the T/M and the lock-up solenoid 6 is provided. A monitor circuit 18 for the lock-up solenoid 6 is provided whose input terminal is connected to the output terminal of the driving circuit 17. By means of this monitor circuit 18, the signal from the lock-up solenoid 6 is continuously monitored. When the output command from the CPU 11 and the monitor signal coincide with each other, it is determined that the lock-up solenoid 6 is in a normal state, while when they do not coincide with each other, it is determined that the lock-up solenoid 6 is in a failure state.

In a case where the lock-up solenoid 6 is in a failure state, the signal from the sensor 3 for the oil temperature in the T/M is continuously detected. When the oil temperature in the T/M exceeds an allowable level (for example, 150° C.) for the T/M, gear shift to the maximum gear stage is prohibited. That is, if the drive is in the maximum gear stage when the temperature exceeds the allowable level, the T/M is downshifted. By this control, the amount of slippage (speed ratio) in the torque converter which tends to become greater in the maximum gear stage can be reduced, and rise in the oil temperature in the T/M can be prevented.

Furthermore, the failure state can sound an alarm to a driver by the operation of the failure alarm device 7 through the driving circuit 19 for the failure alarm device.

Figure 5:
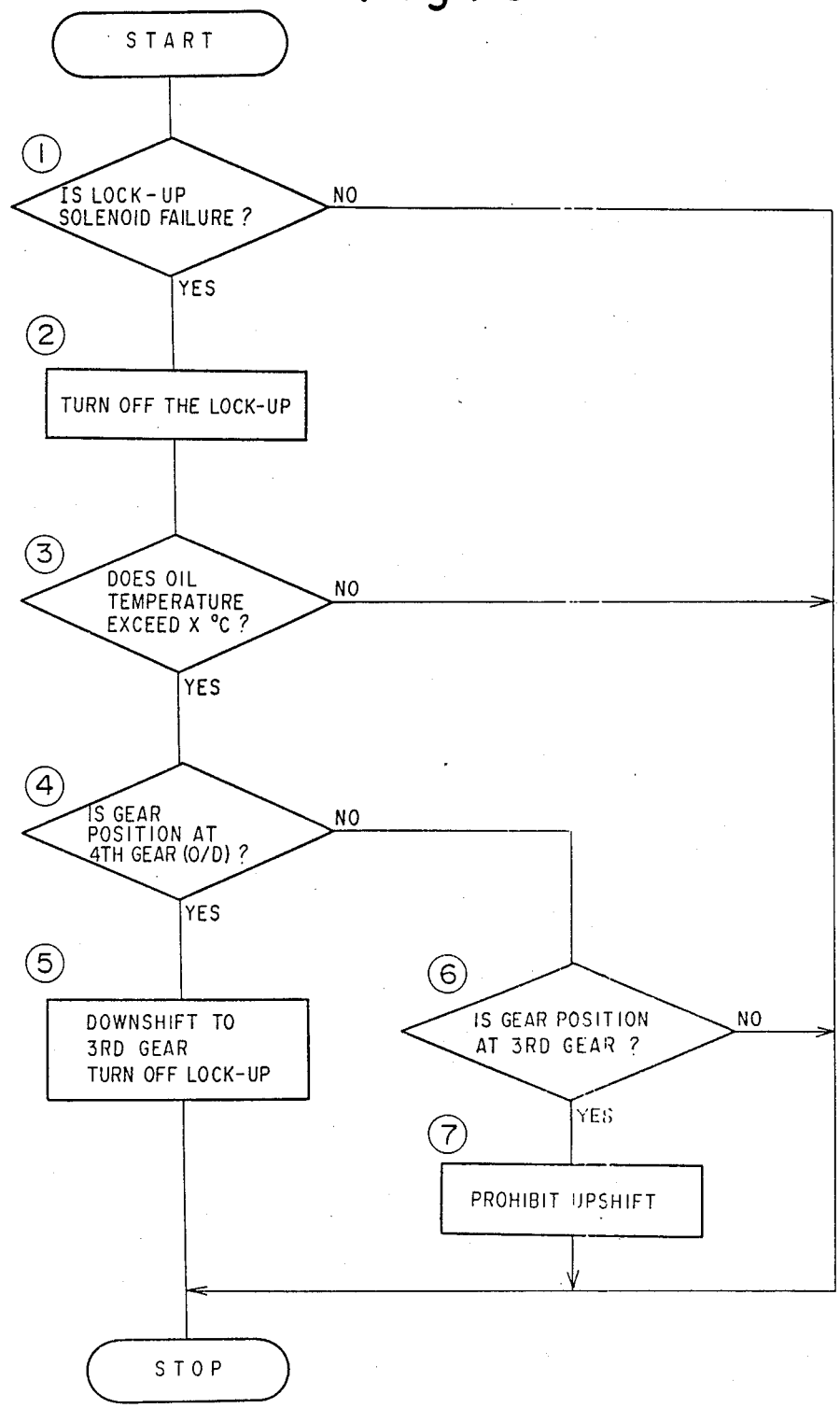
FIG. 5 is a flow chart illustrating operation of the fail-safe control system for an electronically controlled automatic transmission according to the present invention.

An operation of this system will be described in detail with reference to the flow chart shown in FIG. 5.

First, as described above, it is determined whether or not the lock-up solenoid is in a failure state (step 1 ).

Next, in a case where the lock-up solenoid is in the failure state, the lock-up clutch is switched off (step 2 ).

Next, it is determined whether the oil temperature exceeds X° C. or not (step 3 ).

Then, when the oil temperature exceeds X° C., it is determined whether the gear position is at the fourth speed overdrive (0/D) or not (step 4 ).

Next, in a case where the gear position is in the fourth speed (0/D), downshift to the third speed is performed and the lock-up clutch is turned off (step 5 ).

In a case where the gear position is not in the fourth speed (0/D) in the previous step 4 , it is determined whether or not the gear position is at the third speed (step 6 ).

In a case where the gear position is in the third speed, up-shift is prohibited (step 7 ).

The present invention is not limited to the abovedescribed embodiment; other various modifications based on the spirit of the present invention are possible and they are not excluded from the scope of the present invention.

What we claim is:

1. A fail-safe control system for an electronically controlled automatic transmission including a plurality of gear stages, a lock-up clutch and a lock-up solenoid, said system comprising:
   (a) monitor circuit means for detecting a failure state of said lock-up solenoid;
   (b) means for preventing engagement of the lock-up clutch when said failure state is detected;
   (c) an oil temperature sensor provided for
   (d) means for determining if the oil temperature of said transmission detected by said oil temperature sensor exceeds an allowable level; and
   (e) means for prohibiting gear shift to the maximum gear stage when (1) said failure state is detected and (2) said determining means determines that the oil temperature of said transmission exceeds said allowable level.

2. A fail-safe control system for an electronically controlled automatic transmission according to claim 1, wherein said state in which gear shift to the maximum gear state is prohibited is signalled by operation of a failure alarm device.

3. A fail-safe control method for an electronically controlled automatic transmission including a plurality of gear stages, a lock-up clutch and a lock-up solenoid for operating said lock-up clutch, comprising:
   (a) detecting a failure state of said lock-up solenoid by a monitor circuit;
   (b) detecting the oil temperature of said transmission by an oil temperature sensor provided for said transmission;
   (c) determining if the oil temperature of said transmission detected by said oil temperature sensor exceeds an allowable level; and
   (d) prohibiting gear shift to the maximum gear stage when (1) said failure state is detected by said monitor circuit and (2) said determining means determines that the oil temperature of said transmission exceeds said allowable level.

4. The fail-safe control system according to claim 1 further comprising means for determining if the transmission is in its maximum gear stage and means for downshifting if determined to be in the maximum gear stage.

* * * * *

UNITED STATES PATENT AND TRADEMARK OFFICE
CERTIFICATE OF CORRECTION

PATENT NO. : 4,914,982

DATED : April 10, 1990

INVENTOR(S) : ITO et al

It is certified that error appears in the above-identified patent and that said Letters Patent is hereby corrected as shown below:

Col. 1, line 39, after "to" insert --high--.

Col. 2, line 32, "revolution" should read --revolutions--.

Col. 3, line 1, "cate" should read --cation--.

Col. 4, line 5, "abovede-" should read --above-de- --; and line 19, after "for" insert --said transmission--.

Signed and Sealed this

Eleventh Day of June, 1991

Attest:

HARRY F. MANBECK, JR.

Attesting Officer     Commissioner of Patents and Trademarks